(12) United States Patent
Buchgraber

(10) Patent No.: US 7,621,303 B2
(45) Date of Patent: Nov. 24, 2009

(54) FILLER TUBE FOR THE FUEL TANK OF A MOTOR VEHICLE WITH SELECTIVE OPENING

(75) Inventor: Markus Buchgraber, Ilz (AT)

(73) Assignee: Tesma Motoren-Und Getriebetechnik GmbH, Sinaberlkirchen (AT)

( * ) Notice: Subject to any disclaimer, the term of this patent is extended or adjusted under 35 U.S.C. 154(b) by 189 days.

(21) Appl. No.: 11/632,506

(22) PCT Filed: Jul. 15, 2005

(86) PCT No.: PCT/AT2005/000276

§ 371 (c)(1),
(2), (4) Date: Mar. 16, 2007

(87) PCT Pub. No.: WO2006/007618

PCT Pub. Date: Jan. 26, 2006

(65) Prior Publication Data

US 2008/0092986 A1  Apr. 24, 2008

(30) Foreign Application Priority Data

Jul. 16, 2004  (AT) .............................. GM504/2004

(51) Int. Cl.
*B65B 1/04* (2006.01)
*B65B 3/00* (2006.01)

(52) U.S. Cl. ........................ 141/350; 141/348; 141/349; 220/86.2

(58) Field of Classification Search ...................... 141/2, 141/18, 97, 348–352, 363–366, 369, 370, 141/382; 220/86.2
See application file for complete search history.

(56) References Cited

U.S. PATENT DOCUMENTS

| 3,730,216 | A  | * | 5/1973  | Arnett et al. | ................. | 137/588 |
| 6,968,874 | B1 | * | 11/2005 | Gabbey et al. | ............... | 141/349 |
| 7,077,178 | B2 | * | 7/2006  | Hedevang      | .................... | 141/367 |
| 7,293,586 | B2 | * | 11/2007 | Groom et al.  | ............... | 141/350 |

FOREIGN PATENT DOCUMENTS

| DE | 100 51 212 | 7/2002 |
| DE | 101 57 090 | 4/2003 |
| EP | 1 262 355  | 12/2002 |

* cited by examiner

*Primary Examiner*—Timothy L Maust
(74) *Attorney, Agent, or Firm*—Bachman & LaPointe, P.C.

(57) ABSTRACT

A filler neck for the fuel tank of a motor vehicle, comprising a flap and a locking element. The filler neck is designed such that it is impossible to fill the tank with the wrong fuel. The foregoing is achieved by the fact that the flap can be rotated about a hinge pin which is three-dimensionally movable and while the flap is retained by at least two elements that are pivotable about one respective pin. One of the pivotable elements supports the hinge pin of the flap while another pivotable element is configured as a locking lever that is disposed across from the hinge pin.

5 Claims, 4 Drawing Sheets

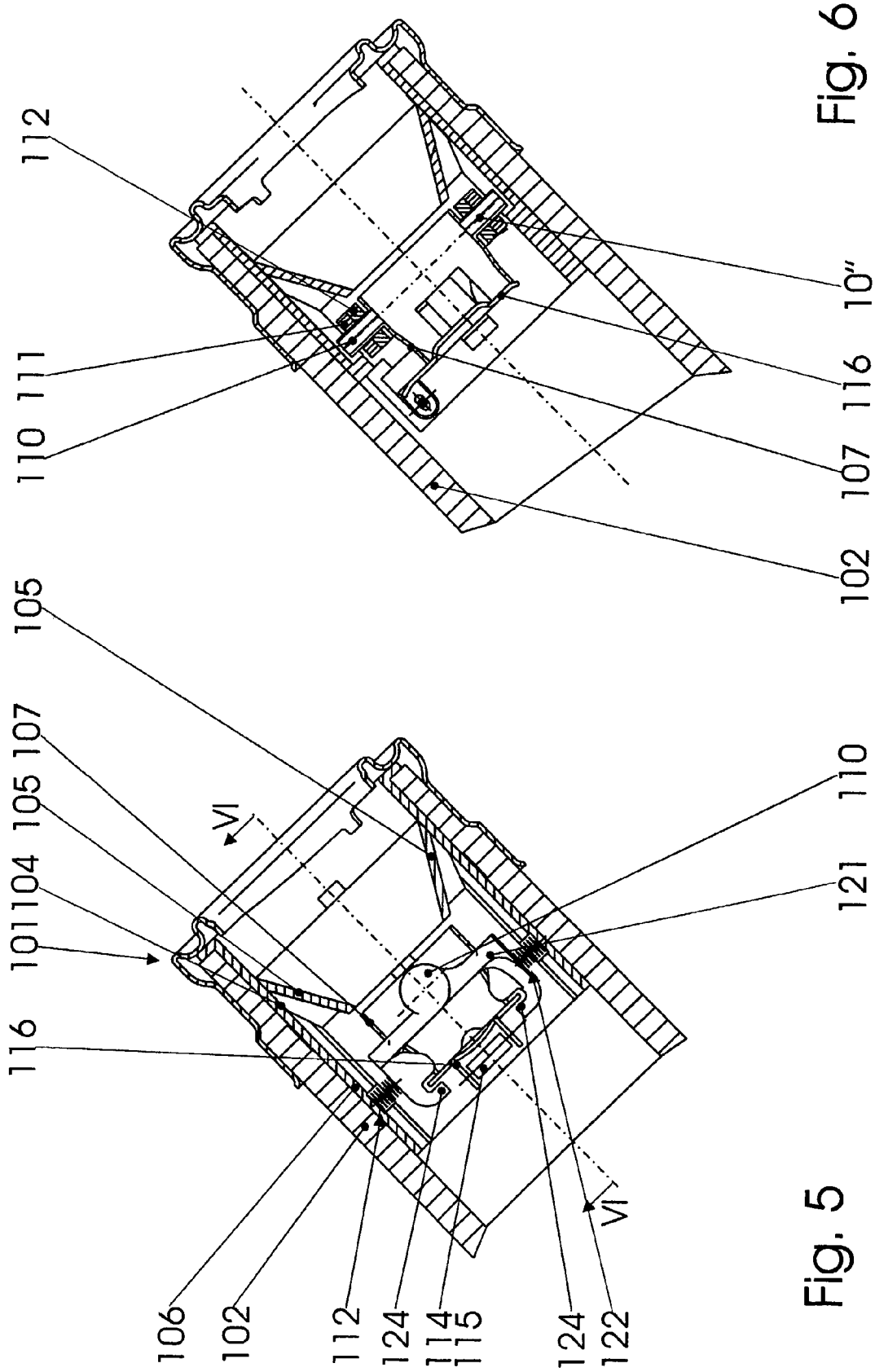

FILLER TUBE FOR THE FUEL TANK OF A MOTOR VEHICLE WITH SELECTIVE OPENING

BACKGROUND OF THE INVENTION

The invention relates to filler necks for the fuel tank of a motor vehicle, having a funnel-type insert and, adjoining the latter in the inward direction, a pivotable flap with a locking element which can be pivoted counter to the force of a spring by the filler tube of a gas-pump nozzle so as to release the flap. For refueling purposes, the filler tube of a gas-pump nozzle is inserted into the funnel part, the diameter of the filler tube differing in dependence on the type of fuel. The diameter is large enough for diesel and leaded gasoline (the use of which is dying out) and small for unleaded gasoline. The narrowest diameter of the funnel part is selected correspondingly.

It is not possible to insert the relatively thick filler tube into the narrower funnel. How is it possible, however, to prevent the relatively thin end tube from being inserted into the wider funnel? This is the question on which the invention is based.

Ep 11 99 208 A1 discloses a solution to this problem. This consists in the inner part of the funnel being somewhat narrower than the relatively wide end tube used for diesel fuel and being displaceable along its longitudinal axis. When the relatively wide end tube is inserted, it is displaced and releases the connection to a refueling venting line; it acts, to a certain extent, as a valve. This does not take place with the narrower end tube; the refueling venting means is blocked. It is not possible here, however, to prevent filling with the incorrect fuel. With a sufficiently small level of throughflow, that is to say if flow does not take place through the entire cross section of the filler tube.

In the case of a further device which is known from DE 100 51 212 A1, a flap known as an unleaded flap is secured by means of at least one locking lever which projects, by way of a shoulder, into the interior of a funnel-type insert. When a filler tube of sufficiently large diameter is inserted, the locking lever is forced to one side and the flap is opened. This does not take place if the diameter of the filler tube is too small. However, it has been found that the mechanism can be activated improperly if an excessively thin filler tube is inserted obliquely and moved about appropriately.

The invention, then, is to propose a solution which reliably prevents filling with the incorrect fuel; this is obviously to be done with the lowest possible level of structural outlay.

SUMMARY OF THE INVENTION

The foregoing is achieved according to the invention in that the flap can be rotated about a hinge pin, which can be displaced in space, and is retained by at least two elements which can each be pivoted about a pin and only release the flap when the two elements are pivoted to one side, counter to the force of a spring, by the inserted filler tube. Since the hinge pin is not fixed in space, the flap and the elements retaining it can orient themselves in space in accordance with the oblique positioning of the filler tube of the gas-pump nozzle. It is thus no longer possible to activate the locking means improperly. The question of how the hinge pin is guided in a movable manner can be addressed in different ways within the context of the invention. The pivot pins (or pivot shafts) of the elements, in contrast, are fixed in space.

In a practical embodiment, two preferably mutually opposite elements can be pivoted about a common pin which is fixed in space, in the filler neck, above the flap, and the springs, which act on the elements, are supported on the inside of the filler neck. Together with the displaceable hinge pin, it is thus possible for one element to be pushed in by oblique insertion of the filler tube; the opposite element, however, is adjusted accordingly by its spring. The common pin results in a marked reduction in the production costs.

One embodiment provides between the funnel-type insert and the flap a funnel part which can be pivoted about a spatially fixed pin, on which the hinge pin for the flap is fitted and against the lower periphery of which the closed flap butts, and at least one of the pivotable elements is a locking lever with an oblique shoulder projecting into the funnel part and with, at its inward end, a claw which engages around the flap. The hinge pin is thus guided by the pivotable funnel part which, for its part, orients itself in accordance with the inserted filler tube of the gas-pump nozzle.

In a development of this embodiment, the spatially fixed pin of the pivotable funnel part is also the pin of the two pivotable elements, which are mutually opposite locking levers, and the hinge pin is transverse to the pivot pin of the elements. It is thus the case that just one single pin is necessary for all three movable parts.

In a second, particularly advantageous embodiment, one of the pivotable elements bears the hinge pin of the flap and a further pivotable element is a locking lever arranged opposite the hinge pin, in each case one compression spring supported in the interior of the filler neck acting on the two pivotable elements. Basically just two pivotable elements are therefore necessary, one of these bearing the hinge pin. The surprising effect of the invention is manifested particularly clearly here. If only the locking lever is forced outward, counter to the force of its spring, by the filler tube, then the entire flap with its hinge pin is forced in the same direction by its spring and thus remains reliably locked.

BRIEF DESCRIPTION OF THE DRAWINGS

The invention will be explained and described hereinbelow with reference to Figures, in which:

FIG. 5 illustrates a longitudinal section through a second embodiment of the subject matter of the invention, and FIG. 6 illustrates a longitudinal section along VI-VI in FIG. 5.

DETAILED DESCRIPTION

Figure 1:
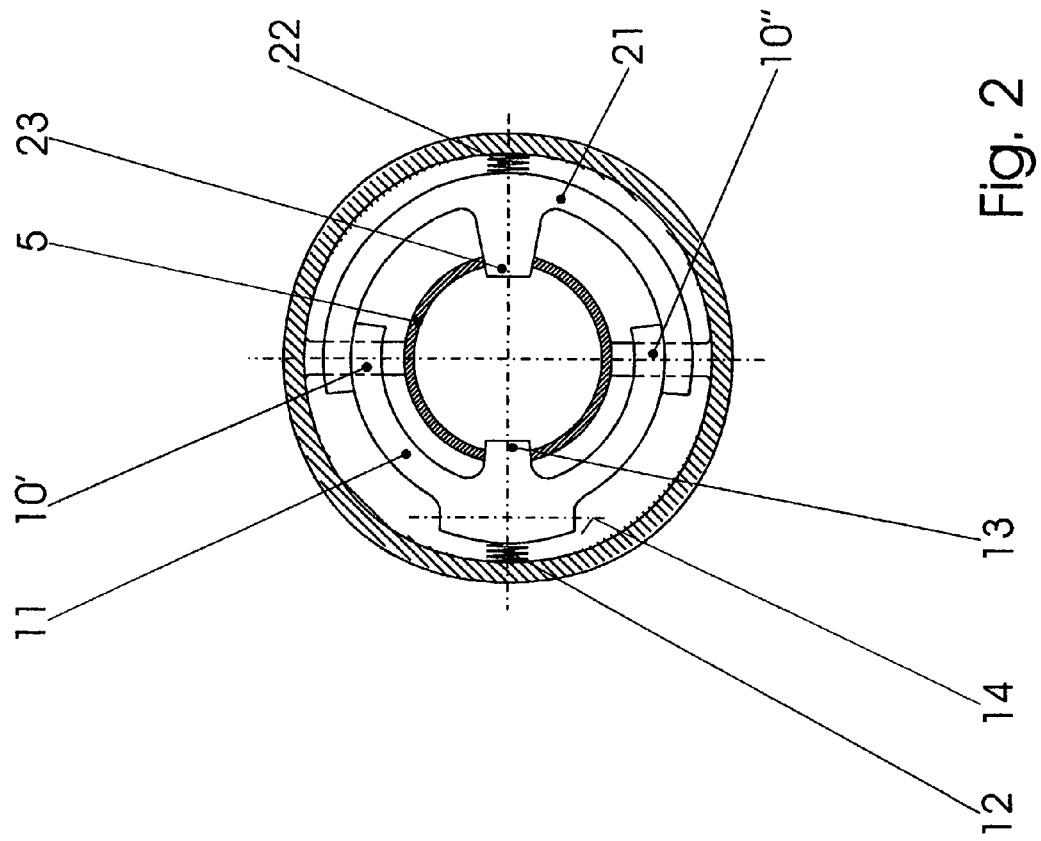
FIG. 1 illustrates a longitudinal section through a first embodiment of the subject matter according to the invention.
Figure 2:
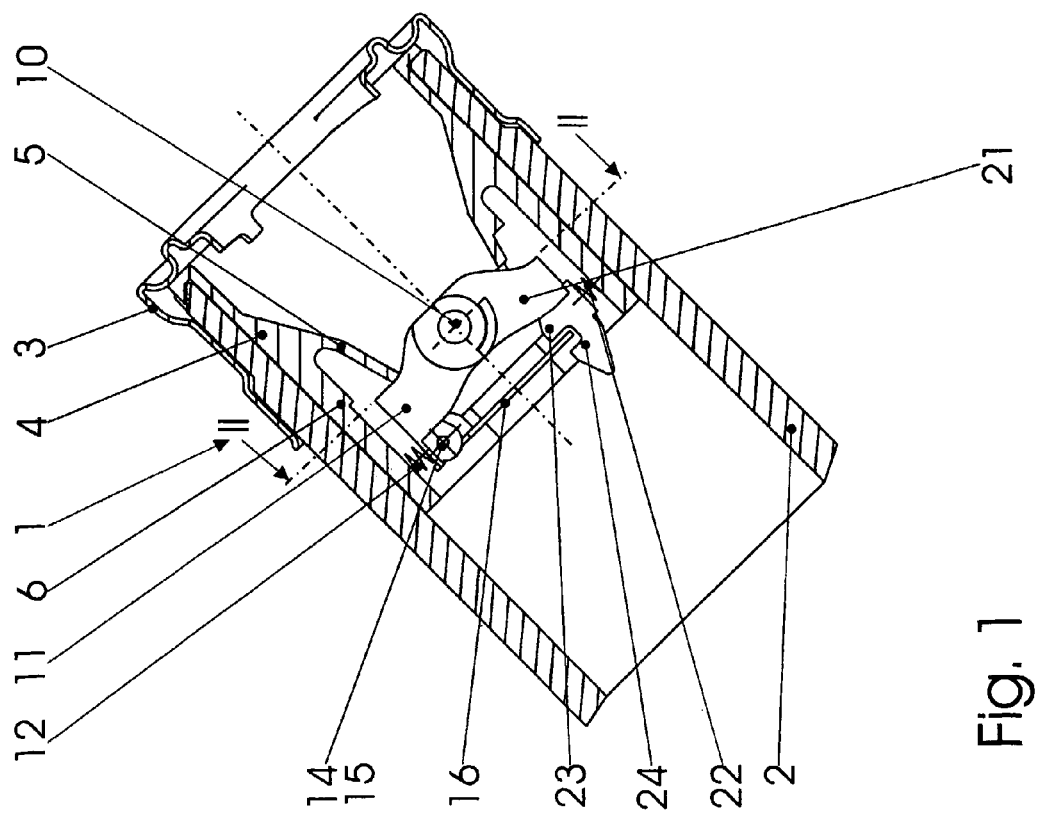
FIG. 2 illustrates a cross section II-II in FIG. 1.

A filler neck is designated overall by 1 in FIGS. 1 and 2. It comprises a tube 2, which leads to the fuel tank (not illustrated), an annular cap 3, which is designed for accommodating a closure, and an insert component 4. In the embodiment depicted, the annular cap 3 retains the insert component 4 in the tube 2. It would also be possible, however, for these parts to be in one piece. The insert component 4 is formed by an inwardly conically tapering funnel-type insert 5 and a tubular insert 6 which butts against the inside of the tube 2.

In the insert component 4, a pivot pin 10 is embodied by two pins 10', 10" arranged between the funnel-type insert 5 and tubular insert 6. Two elements 11, 21 can be pivoted about the pin 10. The elements 11, 21 form essentially semicircular arcs in opposite directions and have their ends mounted on the pins 10', 10". The first element 11 has, approximately in the center of the arc, an oblique shoulder 13 and a hinge pin 14, about which a flap 16 can be pushed open counter to the force of a torsion spring 15. Also acting there is a compression spring 12, which is biased toward forcing the hinge pin 14 inward and has its other end supported on the inside of the tubular insert 6. The second element 21 here is a locking lever which, approximately in the center of the arc, has an oblique shoulder 23 and a claw 24, which engages around, and thus locks, the flap on its side which is located opposite the hinge pin 14. This is also forced inward by a compression spring 22.

Figure 3:
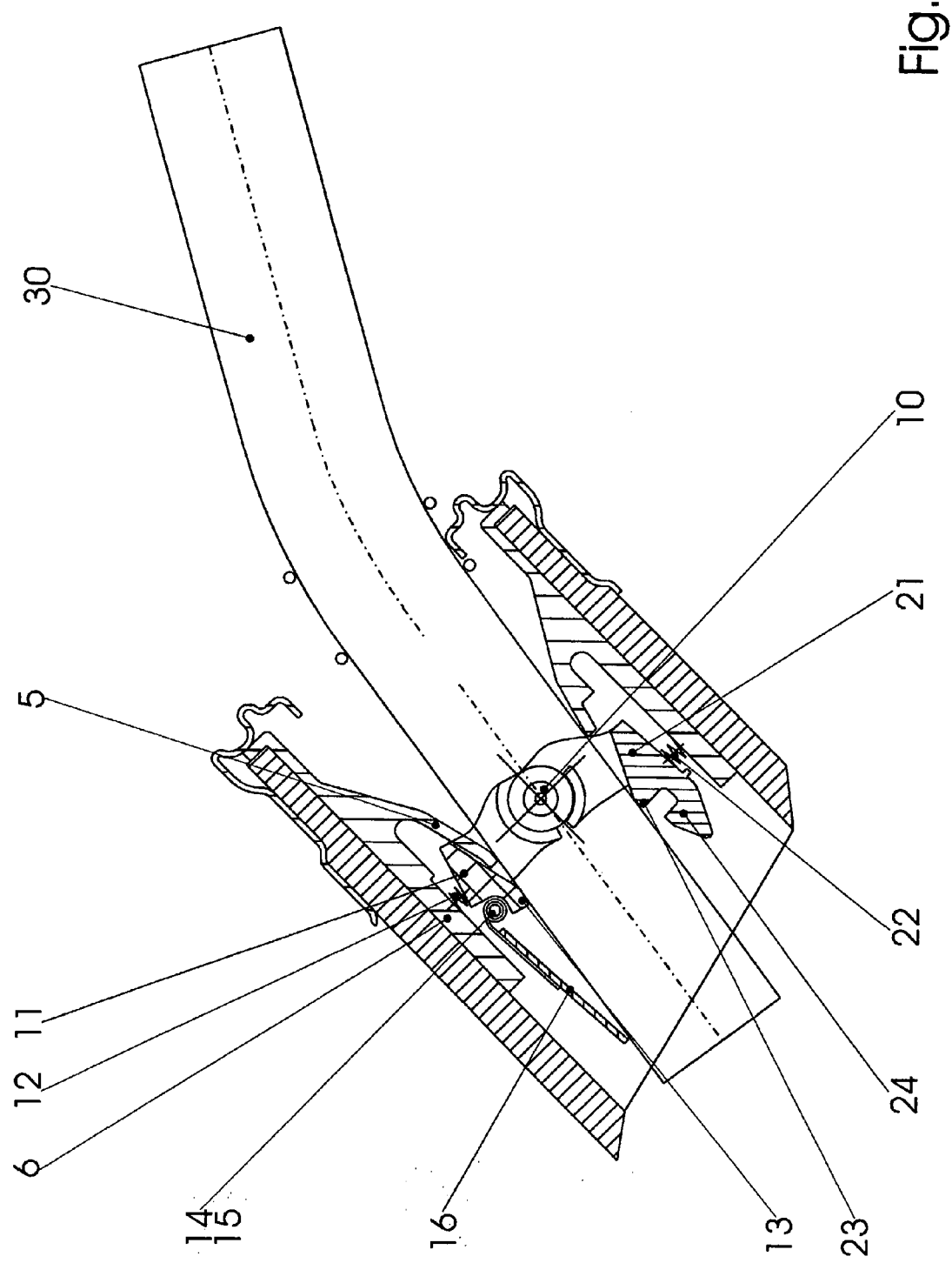
FIG. 3 illustrates a longitudinal section in respect of FIG. 2, with refueling taking place correctly.

FIG. 3 shows the action of the invention as a correct-diameter filler tube 30 belonging to a gas-pump nozzle for the correct fuel is inserted. This diameter is approximately the smallest diameter of the funnel-type insert 5; at any rate, it is not significantly smaller. The filler tube 30 can then move the two shoulders 13, 23 and, therewith, the two elements 11, 21 outward at the same time. This simultaneously results in the claw 24 being drawn away from the flap 16 on one side and, on the other side, in the hinge pin 14 with the flap 16 being drawn away from the claw 24.

Figure 4:
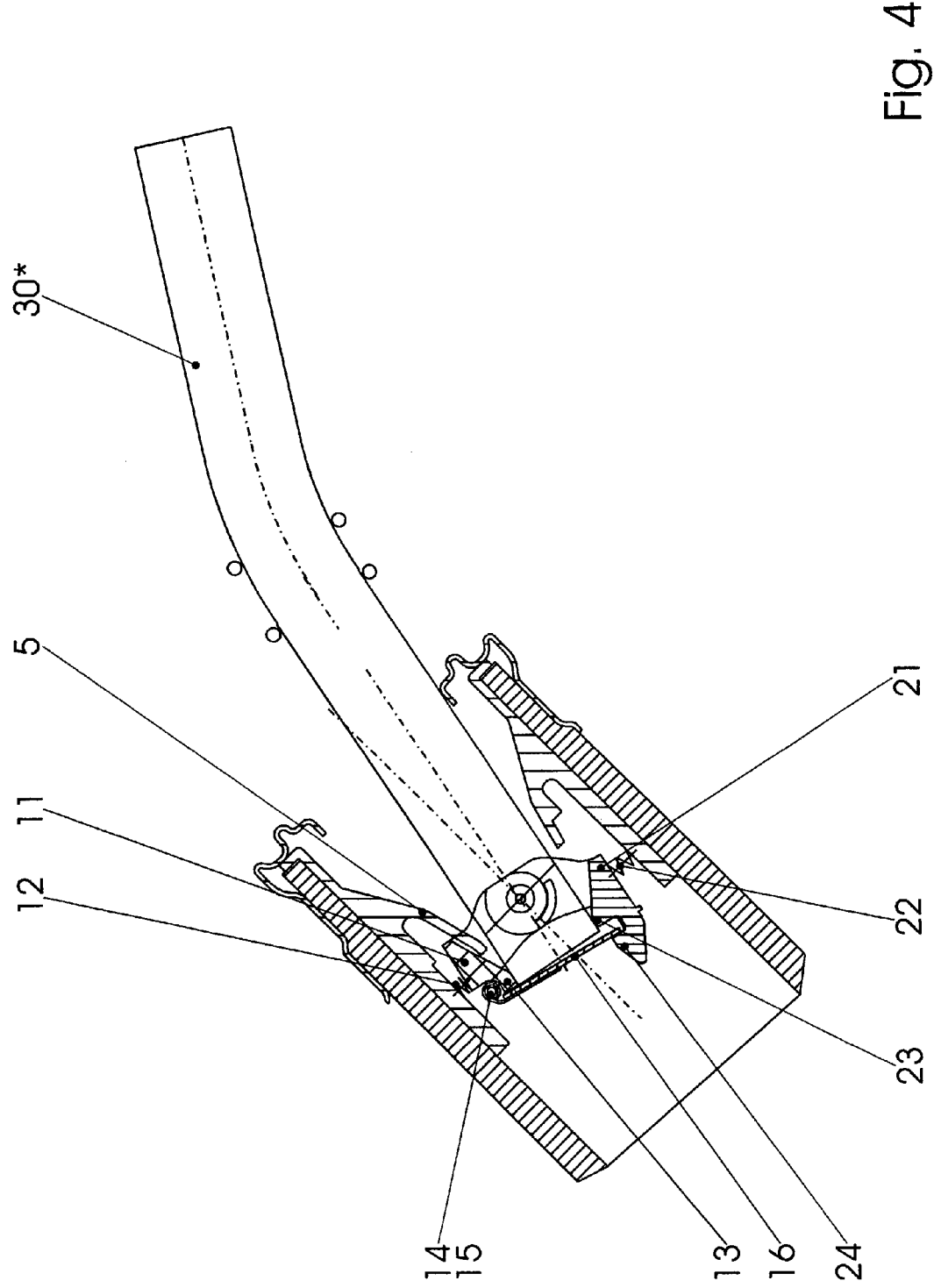
FIG. 4 illustrates the same view as in FIG. 3, but with refueling taking place incorrectly.

FIG. 4 shows the action of the invention as a filler tube 30* of too small a diameter, this filler tube belonging to a gas-pump nozzle for the incorrect fuel, is inserted. The filler tube 30* is guided, for improper activation of the locking means, such that the first element 11 with the hinge pin 14 and the flap 16 is forced outward counter to the force of the spring 12. It is thus possible, however, for the other compression spring 22 on the opposite side to displace the second element with the locking claw 24 in the direction of the center, so that it keeps the flap 16 firmly locked. If the filler tube 30* is inserted such that it displaces the element 21 with the locking claw 24 counter to the force of its spring 22, then, by virtue of the first spring 12, the flap 16 follows in the direction of the locking claw 24.

The embodiment of FIGS. 5 and 6, in which corresponding designations have been increased by 100, differs from the previous embodiment by the funnel-type insert 5 being followed by a funnel part 107 which can be pivoted about the pin 10, and by the two elements 111, 121 being locking claws. At its lower periphery, the pivotable funnel part 107 bears the hinge pin 114 with torsion spring 115 for the flap 116, the hinge pin 114 in this case being oriented at right angles—as seen in the direction of the longitudinal axis of the filler neck as a whole —to the pivot pin 110.

The invention claimed is:

1. A filler neck (1) for the fuel tank of a motor vehicle, comprising a funnel-type insert and, adjoining the latter in an inward direction, a flap with a locking element which, when the filler tube of a gas-pump nozzle is inserted, is moved so as to release the flap, the flap (16; 116) is rotated about a hinge pin (14; 114), which is displaced in space, and is retained by at least two elements (11, 21; 111, 121) which are each pivoted about a pin (10; 110) and only release the flap (16; 116) when the two elements (11, 21; 111; 121) are pivoted to one side, counter to the force of a spring (12, 22; 112, 122), by the inserted filler tube (30).

2. The filler neck as claimed in claim 1, wherein the at least two elements (11, 21; 111, 121) are pivoted about a common pin (10; 110) which is fixed in space, in the filler neck (1; 101), above the flap (16; 116), and in that the springs (12, 22; 112, 122), which act on the elements (11, 21; 111, 121), are supported on the inside of the filler neck (1; 101).

3. The filler neck as claimed in claim 1, wherein, provided between a funnel-type insert (105) and the flap (116) is a funnel part (107) which can be pivoted about a spatially fixed pin (110), on which the hinge pin (114) for the flap (116) is fitted and against the lower periphery of which the closed flap (116) butts, and in that at least one pivotable element (111, 121) is a locking lever with a shoulder (13) projecting into the funnel part (107) and with a claw (124) which, in the inward direction in relation to the shoulder (123), engages around the flap (116).

4. The filler neck as claimed in claim 3, wherein the spatially fixed pin (110) of the pivotable funnel part (107) is also the pin (110) of the two pivotable elements (111, 121), which are mutually opposite locking levers, and the hinge pin (114) is transverse to the pivot pin (110) of the elements.

5. The filler neck as claimed in claim 3, wherein one (11) of the at least two elements (11, 21) bears the hinge pin (14) of the flap (16) and a further pivotable element (21) is a locking lever arranged opposite the hinge pin (14), and wherein one compression spring (12, 22) supported in the interior of the filler neck (1) acts on the two pivotable elements (11, 21).

* * * * *